United States Patent Office 2,837,272
Patented June 3, 1958

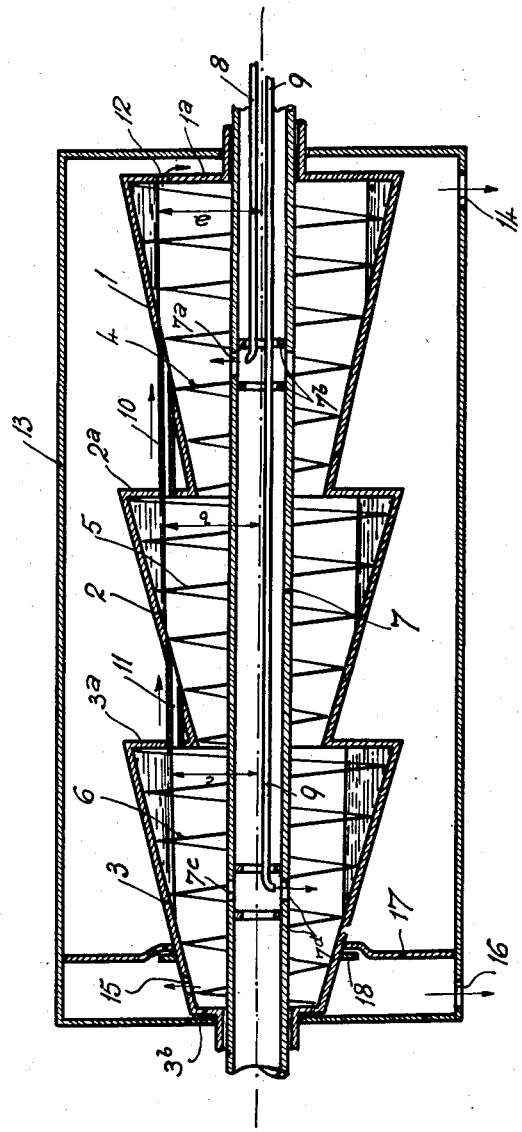
INVENTOR
PIERRE ROBERT LAGUILHARRE

2,837,272

CENTRIFUGAL APPARATUS FOR SEPARATING SOLID PARTICLES OUT OF A LIQUID

Pierre Robert Laguilharre, Enghien-les-Bains, France

Application November 7, 1955, Serial No. 545,476

Claims priority, application France November 9, 1954

9 Claims. (Cl. 233—7)

My invention has for its object improvements in centrifugal machines providing for the separation of solid particles out of a liquid inside which they form a suspension and it relates more particularly to those settling devices including at least one frustoconical rotary bowl inside which is coaxially mounted a conveyor worm revolving in the same direction as the bowl, but at a slightly different speed. Such machines are applicable in particular to the separation of crystals forming a suspension in the mother lye as in the case of sodium chloride forming a suspension in an aqueous solution of soda and also of all products appearing as an insoluble sludge or precipitate as in the case of the purification of residuary waters.

Settling devices of the said type have already been proposed which include two or more than two stages constituted each by a frustoconical rotary bowl and associated conveyor worm, said stages being arranged coaxially and in alignment; the first stage ensures the centrifugal separation between the solid particles and the liquid originally containing the latter, while the following stages through which the solid material thus removed is caused to pass are designed so as to execute a series of washing and drying steps on the solid material.

However, when it is desired to execute, in multistage devices of the type referred to, a plurality of successive washing steps on the settled solid material so as to purify the latter as much as possible, it was necessary hitherto to provide an input of fresh washing water into each of the successive washing stages, the washing water more or less laden with the material to be removed from the settled solid particles being exhausted separately from each washing stage. This leads to a total expenditure of washing water which is considerable and often prohibitive.

My invention has chiefly for its object to remove this drawback of prior centrifugal settling devices including two or more than two stages. To this end, it consists chiefly in producing in the different stages a counter-current flow between the washing water and the solid material separating out of the latter while a connection is established between the last washing stage into which the fresh washing water is introduced and the successive stages located on the upstream side of said last washing stage with reference to the direction of progression of the separated solid material in a manner such that said water may flow during operation in succession from each washing stage to the preceding stage and be finally discharged out of the device either with the mother lye obtained as a result of the primary settling stage or else directly out of the washing stage located immediately on the side of the settling stage through which the solid material passes out of the latter.

It will be readily ascertained that this arrangement allows executing an efficient and economical washing of the settled product which may thus be highly purified by means of a comparatively small amount of washing water, taking into account the fact that the fresh washing water introduced into the last washing stage meets there a product which is already purified to a considerable extent as a consequence of the partial successive washing stages to which it has been subjected during its passage in the preceding stages, while the same water flowing in counter-current relationship with reference to the separated product performs then fractional washings of the latter and is laden gradually with impurities before it is removed with the mother lye. Further, this intense purification of the separated product is obtained within a much shorter time than that required under similar conditions for reaching an equivalent result in a plant producing a static settling of the solid material associated with successive washings in a series of settling tanks.

In a simple embodiment of the invention, the connection established between the different washing stages, with a view to producing a counter-current flow of the washing water with reference to the progression of the solid material, may include tubular or the like parts connecting the bottom of the rotary bowl in each stage with the lateral wall of the bowl located immediately on the upstream side thereof with reference to the direction of progression of the separated solid material, the connecting point of the different pipes with the corresponding lateral walls being located at distances from the axis of rotation of the device such that the washing water flows only in the desired direction under the action of centrifugal force.

In the practical embodiments of the invention, the bowls in the different stages may, according to the desired results, have lengths and diameters which are either equal or otherwise. In particular, if it is desired chiefly to obtain a good settling, it is preferable to give the bowl in the first stage a length which is substantially greater than that given to the bowls in the washing stages so as to take into account the fact that the operation of the first settling stage produces an output of liquid which is higher than the following stages since the washing water is finally incorporated in the said stage to the motor lye, this greater length preventing also any substantial carrying off with the exhausted liquor of the settled solid particles towards the discharge port or ports provided for said liquor.

It may also be of interest, with a view to preventing any carrying off of the separated solid material by the exhausted liquid to provide baffle plates facing the inner wall of the bottom of the settling bowl in the vicinity of the discharge port or ports.

Further features of the invention will appear in the reading of the following description, reference being made to the accompanying drawing the single figure of which, given by way of example and by no means in a limiting sense, is a diagrammatic axial cross-section of a preferred embodiment of my improved apparatus.

In the example illustrated, the separating apparatus according to my invention, includes three stages constituted each by a frustoconical bowl, the three bowls 1, 2, 3 being arranged coaxially in sequence, and each bowl carrying a conveyor worm 4, 5, 6, the three conveyor worms being fitted on a common tubular shaft 7 extending coaxially with reference to the bowls 1, 2, 3 and lying horizontally in the case illustrated. The bowl 1 which is longer than the bowls 2 and 3 so as to ensure a better settling effect, is provided at its large diameter end with a solid flat bottom 1a having a central opening through which it is revolubly mounted on the tubular shaft 7; the smaller diameter end of the said bowl 1 is open and is fluidtightly connected with the annular bottom 2a closing the adjacent end of the next bowl 2. Similarly, the smaller diameter end of the said bowl 2 is open and its periphery is connected fluidtightly with an annular bottom or cover 3a closing the adjacent large diameter end of the bowl 3 the free end of which latter is closed by a flat cover 3b revolubly fitted over the shaft 7.

Control members of any known type, which are not illustrated, drive into rotation the bowls 1, 2, 3 on the one hand and the shaft 7 carrying the worms 4, 5, 6 on the other hand, the two rotations being performed at slightly different speeds.

The liquid laden with solid material to be separated out of it is introduced into the bowl 1 through a stationary pipe 8 extending inside the shaft 7 and opening into register with ports such as 7a formed in the wall of the said hollow shaft 7 between annular baffle plates 7b extending across the inside of said shaft. On the other hand, the washing water is introduced into the other external bowl 3 through a stationary pipe 9 opening into register with the ports 7c formed in the wall of the shaft between annular baffle plates 7d provided inside said shaft.

At a suitable point defined as disclosed hereinafter, there is provided through the bottom 2a of the bowl 2 and the side wall of the bowl 1 a connection constituted by a pipe 10 arranged as shown in the present case in parallelism with the axis of the device and adapted to form a passageway between the two bowls. Similarly, a connection is provided through the bottom 3a of the bowl 3 and the side wall of the bowl 2 as constituted by a pipe 11 opening thus into the two bowls 2 and 3. A port 12 formed at a suitable level in the bottom 1a of the bowl 1, allows discharging the mother lye formed as a result of the settling procedure as disclosed hereinabove, the said mother lye flowing out into a stationary casing 13 out of which it may be removed at 14.

Under the action of the rotation imparted to the unit including the bowls 1, 2 and 3, the liquid laden with solid material to be separated and introduced at 7a into the bowl 1, is subjected to centrifugation so as to form a liquid annulus in the portion of the bowl adjacent to its large diameter end. This centrifugation produces a separation of the solid particles forming a suspension in the liquid and the solid material thus separated out moves over the inner surface of the wall of the bowl 1 and is urged by the propelling worm 4 into the intermediate bowl 2.

In the said bowl 2, the solid particles carrying still a comparatively large amount of liquid laden with soluble impurities, meet the washing water urged centrifugally outwardly under the action of the rotation of the bowl 2, which washing water has entered the bowl 2 out of the bowl 3 through the pipe 11. This washing water which has been loaded with a certain amount of impurities inside the bowl 3, retains however, a substantial dissolving power with reference to the impurities carried along by the solid particles inside the bowl 3 and it frees, therefore, said particles of a fraction of their impurities; on the other hand the washing water thus laden with impurities, enters finally through the pipe 10 inside the bowl 1 out of which it is discharged at 12 with the mother lye formed through the settling performed inside the bowl.

Under the action of the centrifugation to which the washing water is subjected inside the intermediate bowl 2, the solid particles are subjected to a further settling procedure which separates them from the said washing water and, when thus separated out, they move over the inner surface of the wall of the bowl 2 and are then urged by the worm 5 inside the bowl 3. Inside the latter, the solid particles meet the fresh washing water introduced at 7c, which water frees the solid particles of practically all the remaining soluble impurities carried along by them.

The solid product thus purified progresses along the wall of the bowl 3 on which it dries more or less completely and it is finally discharged at 15 at the free end of the said bowl 3, beyond which it drops into the casing 13 so as to be collected at 16. A partition 17 extending across the casing 13 and forming a baffle system with an annular plate 18 fitted round the bowl 3 ensures a separation between the two compartments of the casing 13 which serve respectively for collecting the separated solid particles and the exhausted aqueous liquid.

It will be readily ascertained that it is necessary to ensure a normal flow of the washing water from the bowl 3 towards the intermediate bowl 2 and from the latter towards the bowl 1 by locating the exhaust port 12 for the mother lyes and the pipes 10 and 11 at distances $a$, $b$, $c$ respectively from the common axis of the arrangement such that $$a \geq b \geq c$$

Obviously, instead of providing, as in the example illustrated diagrammatically in the drawing, a single connecting pipe between the bowls 3 and 2, a single connecting pipe between the bowls 2 and 1 and a single exhaust port 12 in the bottom of the bowl 1, it is possible to provide a plurality of such pipes and ports. In practice, it is of advantage for reasons of equilibrium, to provide two sets of pipes and ports arranged symmetrically with reference to the rotary axis of the device.

On the other hand, and as mentioned hereinabove, it is of interest to prevent any substantial carrying off of the settled solid product by the liquid discharged at 12 and, to this end, to provide on the inner surface of the cover 1a of the bowl 1 and in the vicinity of the exhaust port 12 or of each of the exhaust ports, if several are extant, a rib or projection which is not illustrated, and the shape and direction of which are such as will form a baffle adapted to prevent the solid particles from being carried along with and discharged with the mother lye.

As already disclosed, instead of being discharged at 12 with the mother lye obtained through the settling procedure, the washing water may be exhausted through ports formed in the washing stage preceding the settling stage in the progression of the water, i. e., in the case illustrated through the bottom of the bowl 2.

What I claim is:

1. A centrifugal apparatus for separating solid material out of a liquid, comprising a hollow shaft, at least two separating stages arranged coaxially in register with successive sections of said hollow shaft and including each a frustoconical bowl revolubly mounted on said hollow shaft, the bowls flaring all in the direction of one end of the apparatus, means for making the bowls revolve in unison on the shaft, a cover closing the larger diameter end of the bowl in the stage located at the first mentioned end of the apparatus, said cover engaging revolubly and fluidtightly the hollow shaft through a central opening therein, an annular cover closing the larger diameter end of the bowl in all of the other stages, each annular cover engaging the smaller diameter end of the bowl in the following stage in the direction of the above mentioned end of the apparatus in joining relationship therewith along a circunmference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last-mentioned bowl and means for connecting the bowls in a series of two successive stages, through the cover on the larger diameter end of the bowl in the stage nearer the second end of the apparatus, and through the side wall of the bowl nearer the first mentioned end of the apparatus, the said connecting means providing for the passage of the washing water in succession through the bowls in counter-current relationship with reference to the solid material separated out of the liquid under treatment and moving under the action of the worms in the direction leading from the first to the second end of the apparatus.

2. A centrifugal apparatus for separating solid material out of a liquid, comprising a hollow shaft, at least two separating stages arranged coaxially in register with successive sections of the said hollow shaft and including each a frustoconical bowl revolubly mounted on the said hollow shaft, the bowls flaring all in the direction of one end of the apparatus, means for making the bowls revolve in unison on the shaft, a cover closing the larger diameter end of the bowl in the stage located at the first mentioned end of the apparatus, the said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in the said bowl towards the second end of the apparatus, means for rotating the worms in unison with the shaft in the same direction as the bowls, but at different speeds, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid materials separated out of the liquid in the bowl in the stage nearest the second end of the apparatus is discharged out of last-mentioned bowl and at least one tubular duct parallel with the geometrical axis of the hollow shaft and extending through the larger diameter of each bowl except for the bowl nearest the first mentioned end of the apparatus and through the lateral wall of the following bowl in the direction leading to the first mentioned end of the apparatus to interconnect the successive bowls and to provide for the flow of washing liquid through the successive stages in countercurrent relationship with reference to the movement of the separated solid material, the different ducts lying at distances from the shaft which increase stepwise from the second mentioned end of the apparatus to the opposite end, to constrain the flow of washing water to be performed constantly in an outward radial direction towards said first mentioned end.

3. A centrifugal apparatus for separating solid material out of a liquid, comprising a hollow shaft, at least two separating stages arranged coaxially in register with successive sections of the said hollow shaft and including each a frustoconical bowl revolubly mounted on the said hollow shaft, the bowls flaring all in the direction of one end of the apparatus and having equal lengths and diameters, means for making the bowls revolve in unison on the shafts, a cover closing the larger diameter end of the bowl in the stage located at the first mentioned end of the apparatus, the said cover engaging revolubly and fluidtightly the hollow shaft through a central opening therein, an annular cover closing the larger diameter end of the bowl in all of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in the said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid particles separated out of the liquid in the bowl in the stage nearest the second end of the apparatus are discharged out of last mentioned bowl and means for connecting the bowls of a series of two successive stages, through the cover on the larger diameter end of the bowl in the stage nearest the second end of the apparatus and through the side wall of the bowl nearer the first mentioned end of the apparatus, the said connecting means providing for the passage of the washing water in succession through the bowls in counter-current relationship with reference to the solid material separated out of the liquid under treatment and moving under the action of the worms in the direction leading from the first to the second end of the apparatus.

4. A centrifugal apparatus for separating solid material out of a liquid, comprising a hollow shaft, at least two separating stages arranged coaxially in register with successive sections of the said hollow shaft and including each a frustoconical bowl revolubly mounted on the said hollow shaft, the bowls flaring all in the direction of one end of the apparatus, the diameters and the lengths of the bowls in at least two stages being different from one another, means for making the bowls revolve in unison on the shaft, a cover closing the larger diameter end of the bowl in the stage located at the first mentioned end of the apparatus, the said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in the said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid particles separated out of the liquid in the bowl in the stage nearest the second end of the apparatus are discharged out of lastmentioned bowl and means for connecting the bowls in a series of two successive stages, through the cover on the larger diameter end of the bowl in the stage nearer the second end of the apparatus, and the side wall of the bowl nearer the first mentioned end of the apparatus, the said connecting means providing for the passage of the washing water in succession through the bowls in countercurrent relationship with reference to the solid material separated out of the liquid under treatment and moving under the action of the worms in the direction leading from the first to the second end of the apparatus.

5. A centrifugal apparatus for separating solid material out of a liquid, comprising a hollow shaft, at least two separating stages arranged coaxially in register with successive sections of the said hollow shaft and including each a frustoconical bowl revolubly mounted on the said hollow shaft, the bowls flaring all in the direction of one end of the apparatus, the lengths of the bowls in the different stages being all equal and the diameters of at least two of the said bowls being different from one another, means for making the bowls revolve in unison on the shaft, a cover closing the larger diameter end of the bowl in the stage located at the first mentioned end of the apparatus, the said cover engaging revolubly and fluidtightly the hollow shaft through a central opening therein, an annular cover closing the larger diameter end of the bowl in all other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in the said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last mentioned bowl and means for connecting the bowls in a series of two successive stages, through the cover on the larger diameter end of the bowl in the stage nearer the second end of the apparatus and through the side wall of the bowl nearer the first mentioned end of the apparatus, the said connecting means providing for the passage of the washing water in succession through the bowls in counter-current relationship with reference to the solid material separated out of the liquid under treatment and moving under the action of the worms in the direction leading from the first to the second end of the apparatus.

6. A centrifugal apparatus for separating solid material out of a liquid, comprising a hollow shaft, at least two separating stages arranged coaxially in register with successive sections of the said hollow shaft and including each a frustoconical bowl revolubly mounted on the said hollow shaft, the bowls flaring all in the direction of one end of the apparatus, the diameters of the bowls in the different stages being all equal and the lengths of at least two of the said bowls being different from one another, means for making the bowls revolve in unison on the shaft, a cover closing the larger diameter end of the bowl in the stage located at the first mentioned end of the apparatus, the said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the firstmentioned end of the apparatus, a conveyor worm mounted coaxially inside each bowl and adapted, when rotated, to urge the solid material separated out of the liquid in the said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last mentioned bowl and means for connecting the bowls in a series of two successive stages through the cover on the larger diameter end of the bowl in the stage nearer the second end of the apparatus and through the side wall of the bowl nearer the first mentioned end of the apparatus, the said connecting means providing for the passage of the washing water in succession through the bowls in counter-current relationship with reference to the solid material separated out of the liquid under treatment and moving under the action of the worms in the direction leading from the first to the second end of the apparatus.

7. A centrifugal apparatus for separating solid material out of a liquid, comprising a hollow shaft, at least two separating stages arranged coaxially in register with successive sections of said hollow shaft and including each a frustoconical bowl revolubly mounted on said hollow shaft, the bowls flaring all in the direction of one end of the apparatus, the length of the bowl nearest the first mentioned end of the apparatus being substantially greater than the length of any other bowl, means for making the bowls revolve in unison on the shaft, a cover closing the larger diameter end of the bowl in the stage located at the first mentioned end of the apparatus, said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in said bowl towards the second end of the apparatus, means for rotating the worms in unison with the shaft in the same direction as the bowls but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last mentioned bowl and means for connecting the bowls in a series of two successive stages through the cover on the larger diameter end of the bowl in the stage nearer the second end of the apparatus, and through the side wall of the bowl nearer the first mentioned end of the apparatus, the said connecting means providing for the passage of the washing water in succession through the bowl in counter-current relationship with reference to the solid material separated out of the liquid under treatment and moving under the action of the worms in the direction leading from the first to the second end of the apparatus.

8. A centrifugal apparatus for separating solid material out of a liquid, comprising a hollow shaft, at least two separating stages arranged coaxially in register with successive sections of said hollow shaft and including each a frustoconical bowl revolubly mounted on said hollow shaft, the bowls flaring all in the direction of one end of the apparatus, means for making the bowls revolve in unison on the shaft, a cover closing the larger diameter end of the bowl in the stage located at the first mentioned end of the apparatus, said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last mentioned bowl, a closed casing having said bowls positioned therein and said shaft extending therethrough, said casing further having a pair of outlet openings each at an opposite end of said casing, an annular plate carried by said bowl in the stage nearest the second end of the bowl, a partition mounted on the inside of said casing cooperating with said plate forming a baffle preventing the flow of liquid and said plate and partition being positioned between said casing outlets and adjacent said solid material discharge means and means for connecting the bowls in a series of two successive stages, through the cover on the larger diameter end of the bowl in the stage nearer the second end of the apparatus and through the side wall of the bowl nearer the first mentioned end of the apparatus, the said connecting means providing for the passage of the washing water in succession through the bowls in counter-current relationship with reference to the solid material separated out of the liquid under treatment and moving under the action of the worms in the direction leading from the first to the second end of the apparatus.

9. A centrifugal apparatus for separating solid material out of a liquid, comprising a hollow shaft, at least two separating stages arranged coaxially in register with successive sections of said hollow shaft and including each a frustoconical bowl revolubly mounted on said hollow shaft, the bowls flaring all in the direction of one end of the apparatus, means for making the bowls revolve in unison on the shaft, a cover closing the larger diameter end of the bowl in the stage located at the first mentioned end of the apparatus, said cover engaging revolubly and fluidtightly the hollow shaft through a central opening therein, an annular cover closing the larger diameter end of the bowl in each of the other stages, each annular cover engaging the smaller diameter end of the bowl in the following stage in the direction of the above mentioned end of the apparatus in joining relationship therewith along a circumference surrounding at a distance the hollow shaft, a flat cover closing the smaller diameter end of the bowl in the stage at the second end of the apparatus and engaging revolubly and fluidtightly the hollow shaft, means for introducing the liquid, laden with the solid material to be separated centrifugally, into the bowl at the first mentioned end of the apparatus, a conveyor worm mounted coaxially inside each bowl and adapted, when rotated, to urge the solid material separated out of the liquid in said bowl towards the second end of the apparatus, means for rotating the worms in unison with the shaft in the same direction as the bowls, but at a different speed, means for introducing washing water into the bowl of the stage located at the second mentioned end of the apparatus, means wherethrough the mother lye produced through the centrifugal separation in the bowl at the first end of the apparatus is exhausted out of the said bowl, means through which the solid material separated out of the liquid in the bowl in the stage nearest the second end of the apparatus is discharged out of last mentioned bowl, means for discharging the washing water through the bottom of the bowl in the stage immediately before the stage at the first mentioned end of the apparatus and means connecting the bowls in any two successive stages up to that containing last mentioned bowl.

References Cited in the file of this patent

UNITED STATES PATENTS 1,087,094   Berrigan _____ Feb. 10, 1914